United States Patent Office 3,536,705
Patented Oct. 27, 1970

3,536,705
Δ²-CEPHALOSPORIN ESTER INTERMEDIATE
Robert R. Chauvette and Edwin H. Flynn, Indianapolis, Ind., assignors to Eli Lilly and Company, Indianapolis, Ind., a corporation of Indiana
No Drawing. Continuation-in-part of application Ser. No. 574,311, Aug. 23, 1966. This application Mar. 11, 1968, Ser. No. 711,904
Int. Cl. C07d 99/24
U.S. Cl. 260—243                                        1 Claim

ABSTRACT OF THE DISCLOSURE p-Methoxybenzyl 7-(2'-thiopheneacetamido)-Δ²-cephalosporanate useful as an intermediate in preparing useful cephalosporin antibiotic compounds.

CROSS REFERENCE

This application is a continuation-in-part of our pending application, Ser. No. 574,311, filed Aug. 23, 1966 now abandoned.

INTRODUCTION

This invention relates to the class of cephalosporin antibiotic substances. More particularly, this invention provides a new Δ²-cephalosporin ester which is of primary interest for its use as an intermediate to the obtaining of valuable Δ³-cephalosporin antibiotic compounds.

In the above prior application, we disclosed and claimed a new method of esterifying penicillin and cephalosporin compounds with easily cleavable blocking groups which protect the penicillin or cephalosporin carboxyl group during subsequent chemical reactions on other parts of the molecule. In addition, that application disclosed the new ester compound of this invention and a method of preparing it.

SUMMARY

This invention thus provides the new and useful compound, p-methoxybenzyl 7-(2'-thiopheneacetamido)-Δ²-cephalosporanate, an ester of the formula

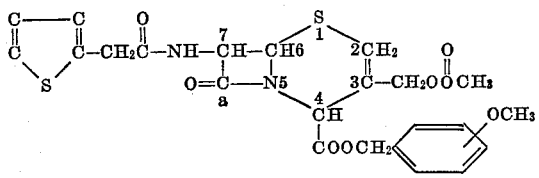

which is useful as an intermediate for a variety of chemical reactions affecting the cephalosporin molecule, such as to oxidize the sulfur in the 1-position to the sulfoxide form to form the p-methoxybenzyl 7(2'-thiopheneacetamido)-Δ³-cephalosporanate sulfoxide ester. This Δ²- cephalosporin ester can also be treated with a dilute basic material by known methods such as with aqueous triethylamine to isomerize a portion thereof to the p-methoxybenzyl 7 - (2' - thiopheneacetamido)-Δ³-cephalosporanate ester. The ester group can then be cleaved by treatment of the ester with trifluoroacetic acid to form an isomeric mixture of 7-(2'-thiopheneacetamido)-Δ²- and Δ³-cephalosporanic acids. The 7-(2'-thiopheneacetamido)-Δ³-cephalosporanic acid is well known by the generic name "cephalothin," and is used in pharmaceutically pure form as the sodium cephalothin salt. If desired, the cephalothin content of this mixture of Δ² and Δ³ acids can be separated by known methods to recover the cephalothin content thereof for antibiotic use. The mixture of acids containing the cephalothin can be used as such, or in the form of an appropriate water soluble or sparingly soluble salt as an antibiotic in various topical veterinary applications.

The invention is further illustrated by the following detailed example of one method of preparing the compound.

EXAMPLE

A solution of 4.0 g. (10 mmoles) of 7-(2-thiopheneacetamido)cephalosporanic acid and 1.4 g. (10 mmoles) of anisyl alcohol in 100 ml. of dry tetrahydrofuran solvent was treated with 2.1 g. (10 mmoles) of N,N-dicyclohexylcarbodiimide and stirred at room temperature overnight. The N,N-dicyclohexylurea precipitate which resulted was filtered off and the solvent was evaporated off and replaced by chloroform for successive washes of the crude ester product with 5 percent aqueous hydrochloric acid, 5 percent aqueous sodium bicarbonate, and water. The chloroform was removed by evaporation, and the 2.5 g. of ester residue was crystallized from warm isopropanol. Fractional recrystallization from ethanol gave 900 mg. of the p-methoxybenzyl 7-(2-thiopheneacetamido)-Δ²-cephalosporanate ester, M.P. 143–144° C. The ultra-violet and nuclear magnetic resonance spectra were consistent with this structure.

Analysis.—Calculated for $C_{24}H_{24}N_2O_7S_2$ (percent): C, 55.80; H, 4.68; N, 5.42. Found (percent): C, 56.08; H, 4.59; N, 5.39.

We claim:
1. p-Methoxybenzyl 7 - (2' - thiopheneacetamido)-Δ²-cephalosporanate.

References Cited

UNITED STATES PATENTS
3,247,196   4/1966   Vischer et al.

FOREIGN PATENTS
1,028,563   5/1966   Great Britain.

NICHOLAS S. RIZZO, Primary Examiner